Patented Oct. 30, 1928.

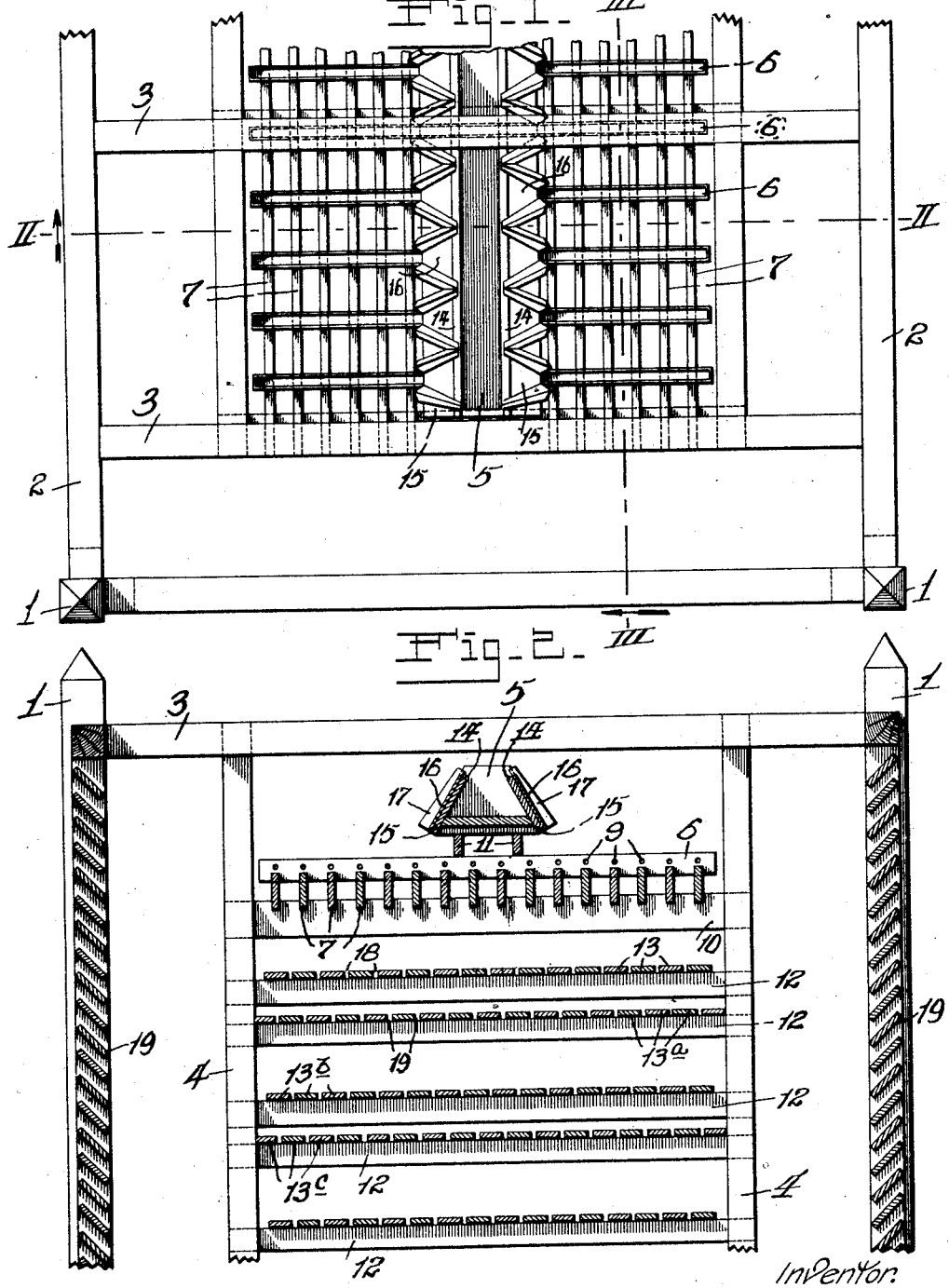

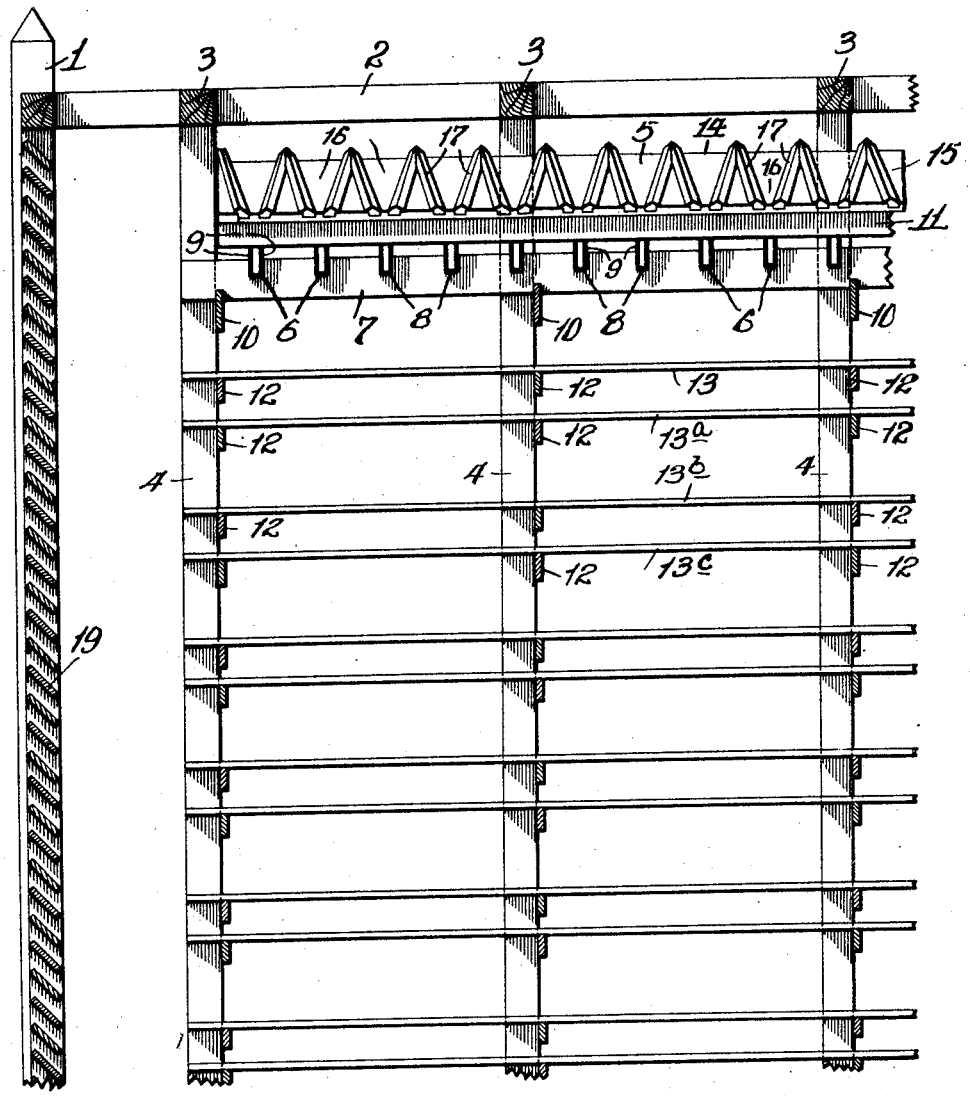

1,690,092

UNITED STATES PATENT OFFICE.

GEORGE J. STOCKER, OF ST. LOUIS, MISSOURI; MERCANTILE TRUST COMPANY, OF ST. LOUIS, MISSOURI, EXECUTOR OF SAID GEORGE J. STOCKER, DECEASED.

WATER-DISTRIBUTING MEANS FOR COOLING TOWERS AND THE LIKE.

Application filed May 14, 1924. Serial No. 713,374.

This invention relates to an improvement in cooling towers and more particularly to the interior construction thereof and has for its primary object the purpose of providing improved means for distributing the water after its discharge from the main trough which is located on the top of the tower.

Other and further objects will appear in the specification and be specifically pointed out in the appended claims, reference being had in the accompanying drawings, exemplifying the invention, and in which:—

Figure 1 is a fragmentary plan view of a cooling tower showing the improvement in water distributing means used in connection therewith.

Figure 2 is a transverse vertical section taken through the upper portion of the tower on the line II—II of Fig. 1.

Figure 3 is a longitudinal vertical section taken through the upper portion of the tower on the line III—III of Fig. 1.

Referring by numerals to the accompanying drawings, 1 designates the vertically arranged corner-posts of a cooling tower being tied to one another by cross-sills such as 2 and horizontally disposed between an opposing pair of cross-sills 2 are a series of transversely extending members 3 and secured to said members 3 at their upper ends are a series of vertically disposed members 4.

Disposed at right angles to the members 3 and arranged horizontally therebeneath is a main distributing trough 5 and located beneath said main trough 5 and at right angles thereto are auxiliary troughs 6.

Located beneath the series of troughs 6 and at right angles thereto are a series of horizontally disposed up edged members or boards 7, each of said members 7 being provided with a series of recesses 8 on their upper edges, the recesses of each member 7 being in alinement with respective recesses of the other members 7, said recesses being for the reception of the auxiliary troughs 6 as shown in Figs. 2 and 3.

Each of the troughs 6 is provided with opposing pairs of apertures 9, said apertures being disposed on a plane above the upper edges of the members 7, each opposing pairs of apertures being in vertical alinement with respective members 7.

Supporting members 10 which are secured in horizontal positions to the vertically disposed members 4 are adapted to support the members 7 in their up edged positions, and inasmuch as the auxiliary troughs 6 are supported by the members 7, the longitudinally extending sills 11 of the main trough 5 can in turn be supported by the troughs 6 as shown in Figs. 2 and 3.

Horizontally secured to the vertically extending members 4 are a series of vertically spaced apart supporting sills 12, each series of sills being disposed on the same horizontal plane, the series of sills next adjacent the members 7 being for the support of a series of spaced apart horizontally disposed flatly arranged boards 13, said boards being disposed parallel with the members 7 and in vertical alinement therebeneath.

The remaining series of supporting sills 12 are each adapted to support a series of flatly arranged spaced apart boards which are further designated in their descending order as $13^a$, $13^b$, $13^c$, etc. to the bottom of the tower, each series of flatly arranged boards, however, being in staggered relation to those of the adjacent series so that the spacing provided between adjacent boards of each series will be in vertical alinement with the approximate center of respective flatly arranged boards of a lower series.

In the operation of this improved water distributing means for cooling towers, the water to be cooled is entrained to the main trough 5 by piping not shown, said trough being kept entirely filled and the over flow therefrom will be over the upper edge 14 of each of the inclined side walls 15 of the trough 5, the water overflow being directed into the pathways 16 provided by the pairs of converging guiding vanes 17 which are secured to each of the side walls 15.

Each opposing pair of pathways 16 are directed to a respective auxiliary trough 6, said troughs 6 being closed at their ends and the water after being received into said troughs 6 from respective pairs of opposing pathways 16 will discharge from said troughs through the apertures 9 provided in the side walls of each trough 6. Owing to the apertures 9 of each trough being arranged in opposing pairs and the up edged members 7 each being arranged in vertical alinement beneath respective opposing pairs of apertures, water discharge from the opposing pairs of apertures will first engage respective upper edges of the members 7 and divide and flow down the vertical sides of each of the members 7.

The water after falling from each of the up edged members 7 will engage the approximate centers of the first series of flatly arranged boards 13 which are arranged therebeneath, the water after engaging respective boards 13 being forced to travel horizontally to respective spacings 18 provided between each adjacent pair of boards 13 and after the water has fallen through the respective spacings it will be received by the next in order series of flatly arranged boards 13ª and through the spacings 19 provided between adjacent pairs of boards 13ª to the next lower series of flatly arranged boards 13ᵇ, etc. until the falling water has reached the approximate lower end of the cooling tower where it is collected and reserved in a cold condition.

With this improved form of construction of water distributing means for cooling towers, the water after engaging the up edged members 7 is distributed in a thin film during its travel down said members 7 and in its travel over the flatly arranged boards 13, 13ª, etc. and by this process the flow of water is at each stage thoroughly broken up as it falls from one series of boards or members to another series thereby offering continually new surfaces to the air passing over the boards or members and thus accelerating the process of cooling by evaporation which is brought on by the contact of the cool air with the hot water, the air being induced into the tower through the ventilated siding 20 forming closure walls to the cooling tower.

What I claim is:—

1. In a cooling apparatus, the combination of a series of up edged spaced apart horizontally extending members, a series of troughs disposed transversely above said up edged members having openings on each side thereof for entraining liquid from said troughs to the upper edge of said members, and a series of spaced apart flatly arranged members located beneath said up edged members each being disposed in vertical alinement with a respective up edged member.

2. In a cooling apparatus, the combination of a series of relatively thin up-edged spaced horizontal members, a plurality of troughs disposed transversely above said horizontal members, means for supplying liquid to said troughs, said troughs having outlets vertically above said horizontal members for delivering the liquid to the latter, and flat baffle members below said horizontal members and parallel thereto for receiving the liquid from the latter.

GEO. J. STOCKER.